L. VUCINOVICH.
FRUIT PICKER.
APPLICATION FILED APR. 10, 1918.
1,304,127.
Patented May 20, 1919.
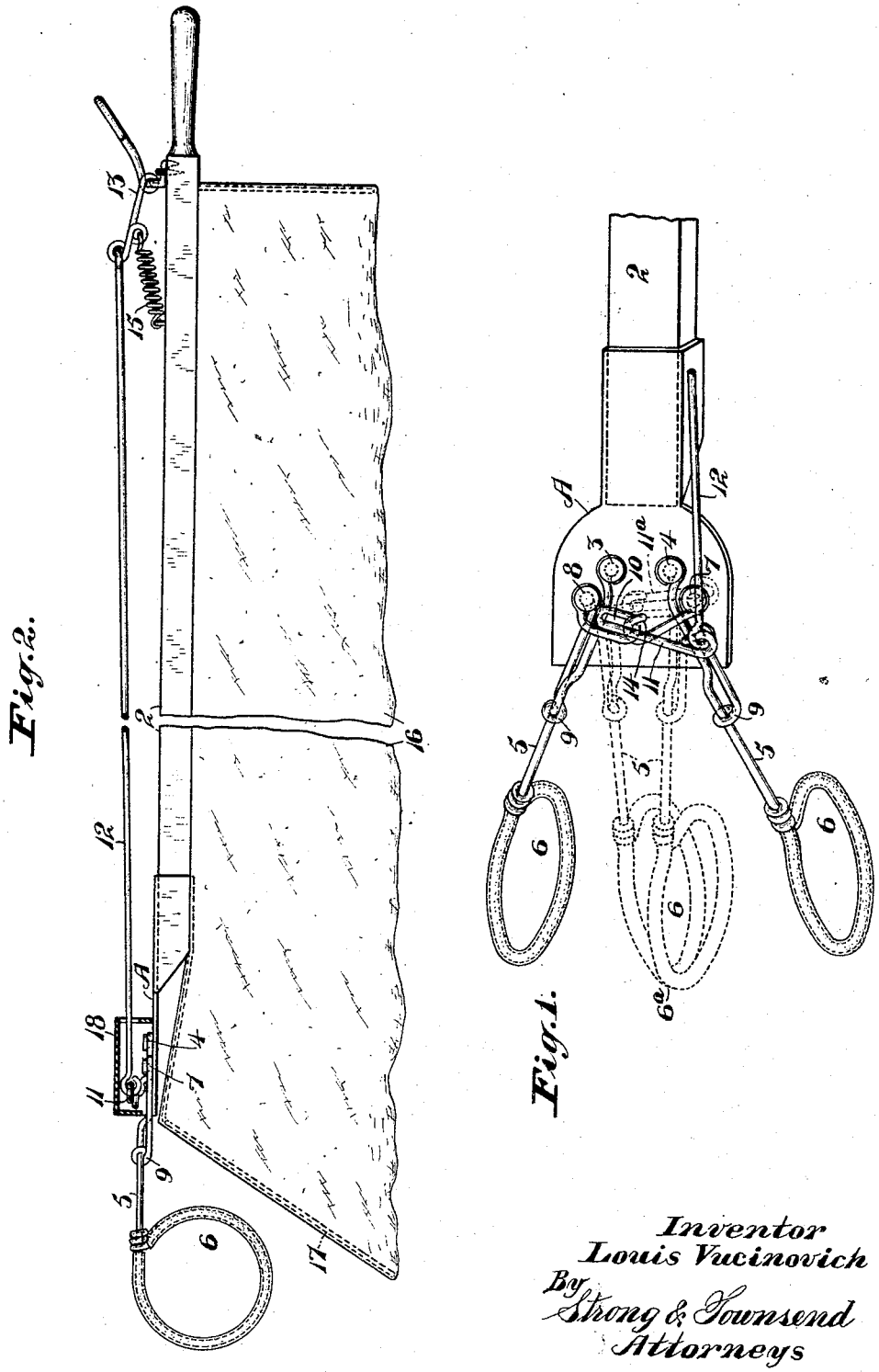
Inventor
Louis Vucinovich
By Strong & Townsend
Attorneys

UNITED STATES PATENT OFFICE.

LOUIS VUCINOVICH, OF ANNAPOLIS, CALIFORNIA.

FRUIT-PICKER.

1,304,127. Specification of Letters Patent. Patented May 20, 1919.

Application filed April 10, 1918. Serial No. 227,761.

*To all whom it may concern:*

Be it known that I, LOUIS VUCINOVICH, a citizen of the United States, residing at Annapolis, in the county of Sonoma and State of California, have invented new and useful Improvements in Fruit-Pickers, of which the following is a specification.

This invention relates to a fruit picker.

One of the objects of the present invention is to provide a simple, cheaply manufactured, easily operated fruit picker which is adapted for gathering fruits, such as apples, pears, plums, oranges, etc., and which is particularly adapted for reaching inaccessible places, such as the top of a tree or the outer ends of the higher branches.

Another object of the invention is to provide a picking mechanism which may be inclosed to such an extent that leaves or twigs cannot enter or in any way interfere with the free operation of the mechanism.

Further objects will hereinafter appear.

The invention consists of the parts and the construction and combination of parts as hereinafter more fully described and claimed, having reference to the accompanying drawings, in which—

Figure 1 is a fragmentary perspective view of the picking arms and the operating mechanism connected with same.

Fig. 2 is a side elevation of the fruit picker, showing it attached to a pole.

Referring to the drawings in detail, A indicates a head member which is adapted to be secured to the upper end of a pole, such as shown at 2. Pivotally mounted on the head member, as at 3 and 4, is a pair of picking arms 5, the upper ends of which are looped, as at 6, and are preferably covered with leather, rubber tubing, or like material to prevent bruising of the fruit when it is being picked. Also pivotally mounted on the head member, as at 7 and 8, is a pair of bell-crank arms, one end of each arm extending parallel with the arms 5 and slidably connected thereto, as at 9. The lower end of one of the bell-cranks is looped, as at 10, and extended, as at 11, to permit it to be attached to a rod 12.

The rod 12 extends down the pole to a spring-actuated lever 13 which is operated by the person using the mechanism. That is, depression of the lever 13, which is pivotally attached to the pole, pulls the rod 12 in a downwardly direction and thereby rocks the connected arms 11 and 9, pivotally mounted at 8, to the dotted line position shown at 11ª; this movement being transmitted to also rock the arm pivotally mounted, as at 7, as the lower end of said arm is hook-shaped, as at 14, and engaged by the looped portion 10 of the arm 11. The two bell-cranks are thus rocked in unison and they in turn force the arms 5 toward each other to the dotted line positions shown at 6ª about the pivots 3 and 4, all the arms being returned to normal position by the spring 15 attached to the operating lever 13. The looped ends 6 of the arms 5 may thus be brought together whenever desired by merely depressing the lever 13, and sufficient pressure may thus be applied to grasp the fruit and pull it loose from the branches.

The fruit, when so removed, is preferably immediately released and may be conveyed to the person operating the picker by securing a canvas tube 16 to the pole. The upper end of this tube is held open by a wire ring 17, so that the fruit, when released by the picker, will drop directly into the mouth of the tube and will thus be conveyed to the operator, the lower end of the tube leading into a basket or other suitable receptacle.

The picking mechanism, comprising the arms 5 and the bell-cranks for operating the same, is preferably inclosed by a housing, such as shown at 18, the upper end of the housing being slotted to permit a free movement of the arms 5 and 9. This housing serves as a protection for the operating mechanism to the extent that no twigs or leaves can enter or in any way interfere with the free operation of the mechanism.

While the arms 5 and the bell-cranks connected thereto are here shown as constructed of wire, I wish it understood that these, together with the other parts of the mechanism, may be constructed of any other material desired or as the judgment or experience of the manufacturer may dictate.

Having thus described my invention, what I claim and desire to secure by Letters Patent is—

1. A fruit picker comprising a head member, a pair of arms pivotally mounted on said member, a pair of bell-cranks pivotally mounted on the head adjacent to said arms, means for rocking said bell-cranks in unison, and means for transmitting the rocking movement of the bell-cranks to rock the first named arms in unison, said means comprising a sliding connection formed between the bell-cranks and the arms.

2. A fruit picker comprising a head, a pair of picking arms pivotally mounted on said head, the free ends of said arms being looped, a pair of bell-cranks pivotally mounted on the head adjacent to said picking arms, a sliding connection between the two bell-cranks and each picking arm, a connection between each bell-crank, and means for rocking one of the bell-cranks.

3. A fruit picker comprising a pole, a head member on the upper end of said pole, a pair of picking arms pivotally mounted on said head member, the outer ends of said arms being looped, a flexible material covering the looped ends of said arms, a pair of bell-cranks pivotally mounted on the head member, one adjacent to each picking arm, a sliding connection formed between the upper end of each bell-crank arm and its adjacent picking arm, an operating lever on the lower end of one of the bell-cranks, said operating arm having a looped portion formed therein, a hook on the lower end of the opposite bell-crank engaging said looped portion, a hand lever on the lower end of the pole, and a connection between said lever and the bell-crank operating lever.

4. A fruit picker comprising a pole, a head member on the upper end of said pole, a pair of picking arms pivotally mounted on said head member, the outer ends of said arms being looped, a flexible material covering the looped ends of said arms, a pair of bell-cranks pivotally mounted on the head member, one adjacent to each picking arm, a sliding connection formed between the upper end of each bell-crank arm and its adjacent picking arm, an operating lever on the lower end of one of the bell-cranks, said operating arm having a looped portion formed therein, a hook on the lower end of the opposite bell-crank engaging said looped portion, means on the lower end of the pole for rocking the bell-cranks and picking arms in unison, said means comprising a pivotally mounted lever on the lower end of the pole, a spring interposed between one end of said lever and the pole, and a rod connecting the lever with the lower end of the bell-crank arm which has a looped portion formed therein.

In testimony whereof I have hereunto set my hand in the presence of the subscribing witness.

LOUIS VUCINOVICH.

Witness:
JOHN H. HERRING.

Copies of this patent may be obtained for five cents each, by addressing the "Commissioner of Patents, Washington, D. C."